(12) United States Patent
Cheng (10) Patent No.: US 6,641,281 B2
(45) Date of Patent: Nov. 4, 2003

(54) LAMP TUBE SUPPORT STRUCTURE

(75) Inventor: Jyi-Fang Cheng, Taipei (TW)

(73) Assignee: Teco Image Systems Co., Ltd., Taipei (TW)

(*) Notice: Subject to any disclaimer, the term of this patent is extended or adjusted under 35 U.S.C. 154(b) by 11 days.

(21) Appl. No.: 10/118,015

(22) Filed: Apr. 9, 2002

(65) Prior Publication Data

US 2003/0189827 A1 Oct. 9, 2003

(51) Int. Cl.$^7$ .................................................. F21S 4/00
(52) U.S. Cl. ........................................ 362/217; 362/396
(58) Field of Search ............................... 362/217, 260, 362/396

(56) References Cited

U.S. PATENT DOCUMENTS

| | | | | | |
|---|---|---|---|---|---|
| 2,287,276 A | * | 6/1942 | Runge | ......................... | 362/217 |
| 2,374,032 A | * | 4/1945 | Mueller | ..................... | 362/217 |
| 2,446,461 A | * | 8/1948 | Diver | .......................... | 362/217 |
| 2,687,516 A | * | 8/1954 | Schneiderman | ............. | 362/217 |
| 3,135,488 A | * | 6/1964 | Leonard | ....................... | 362/217 |
| 5,361,195 A | * | 11/1994 | Chen | ........................... | 362/397 |
| D425,234 S | * | 5/2000 | Marier | ......................... | D26/78 |

* cited by examiner

Primary Examiner—Thomas M. Sember
(74) Attorney, Agent, or Firm—Rosenberg, Klein & Lee (57) ABSTRACT

The present invention provides a lamp tube support structure, which comprises a support piece for fixing a lamp tube. The lamp tube support structure comprises a first half and a second half. The first half has a gap. A clamping portion is formed at two extension ends of the gap. A guard ear is annularly disposed at the inner edge of the gap. Grooves are disposed at left and right ends of the second half. A wing portion is formed below the grooves. The wing portion can be jammed into a hole of a rack for supporting the lamp tube after being bent. The wing portion will elastically spring back to be erectly fixed on the rack. When the lamp tube is placed at the gap of the support piece, it will be fixedly supported on the rack.

5 Claims, 10 Drawing Sheets

LAMP TUBE SUPPORT STRUCTURE

FIELD OF THE INVENTION

The present invention relates to a lamp tube support structure and, more particularly, to a lamp tube support piece of low cost, simple structure, and easy assembly.

BACKGROUND OF THE INVENTION

Figure 1:
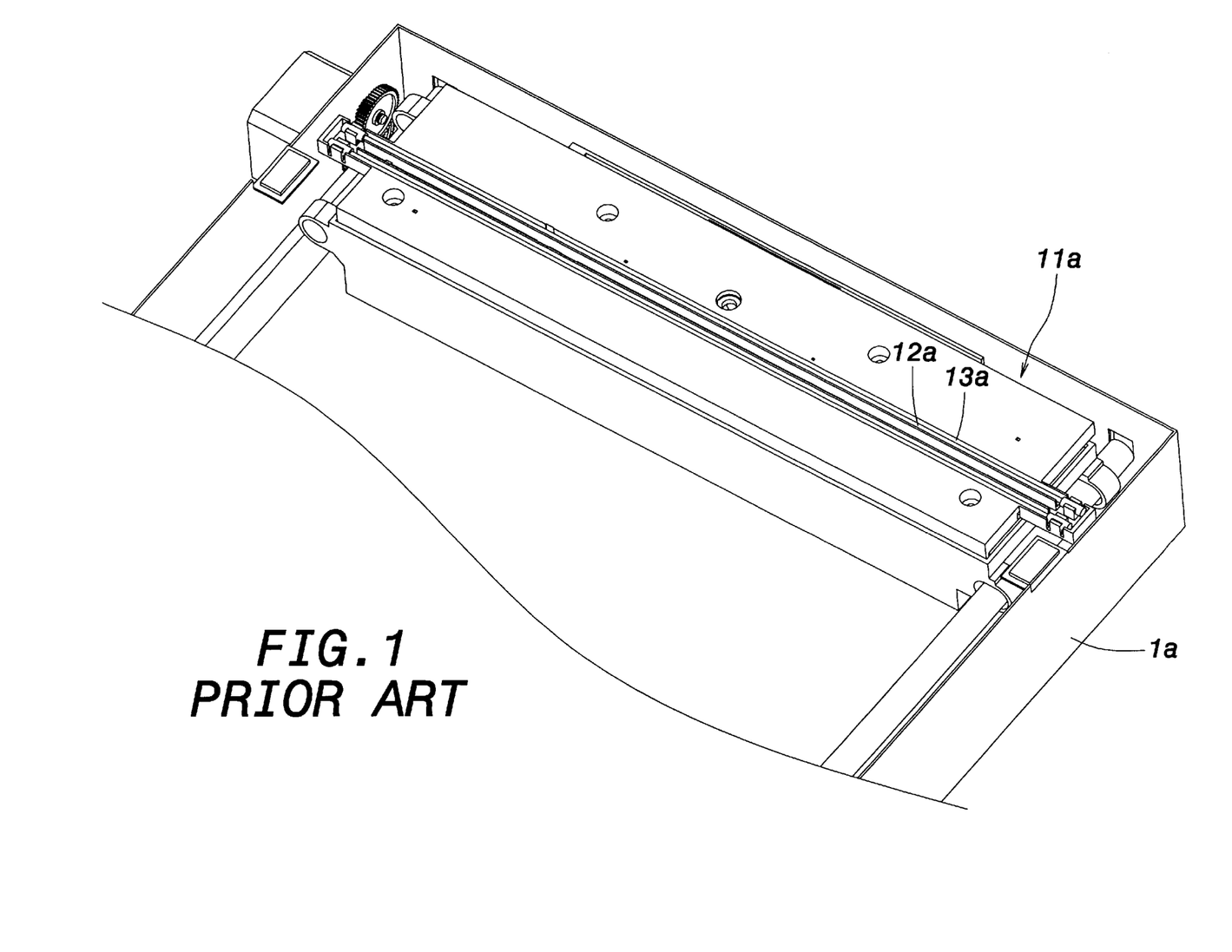
FIG. 1 is a perspective view of a prior art scanner with a lamp tube placed therein.
Figure 2:
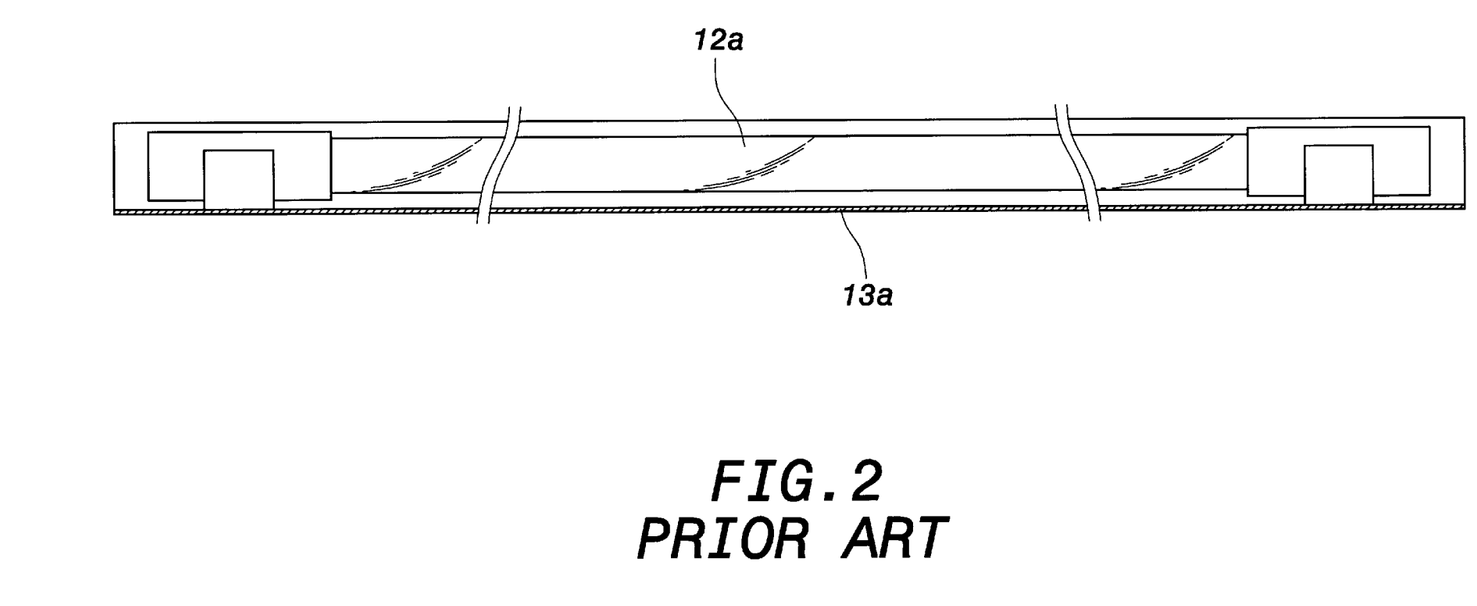
FIG. 2 is a cross-sectional view of a prior art scanner with a lamp tube placed therein.

As shown in FIGS. 1 and 2, a prior art office business machine like a scanner 1a has a lamp seat 11a disposed therein. A lamp tube 12a used as a light source for scanning documents is disposed on the lamp seat 11a. The lamp tube 12a can be divided into single-tube type and double-tube type. A rack 13a for supporting the lamp tube 12a is disposed below the lamp tube 12a. In order to meet the compactness requirement of present products, the lamp tube 12a must be designed to be thinner. Therefore, the lamp tube 12a easily breaks because of vibration of the scanner 1a or careless fall during the transportation process.

Accordingly, the above lamp tube fixing structure has inconvenience and drawbacks in practical use. The present invention aims to resolve the problems in the prior art.

SUMMARY OF THE INVENTION

The primary object of the present invention is to provide a lamp tube support structure, which is slipped onto a lamp tube to add support positions at two ends of the lamp tube for effectively preventing breakage of the lamp tube. Moreover, clamping effect can be achieved to protect the lamp tube from impact from all directions.

To achieve the above object, the present invention provides a lamp tube support structure, which comprises mainly a support piece applying to office business machines for supporting and fixing a lamp tube thereof. The lamp tube support structure comprises a first half and a second half. The first half has a gap for placing a lamp tube. A clamping portion is formed at two extension ends of the gap. Grooves are disposed at left and right ends of the second half. A wing portion is formed below the grooves. After the wing portion is bent, it can be jammed into a hole of a rack for supporting the lamp tube so as to be erectly fixed on the rack.

The various objects and advantages of the present invention will be more readily understood from the following detailed description when read in conjunction with the appended drawing, in which:

DETAILED DESCRIPTION OF THE PREFERRED EMBODIMENTS

Figure 3:
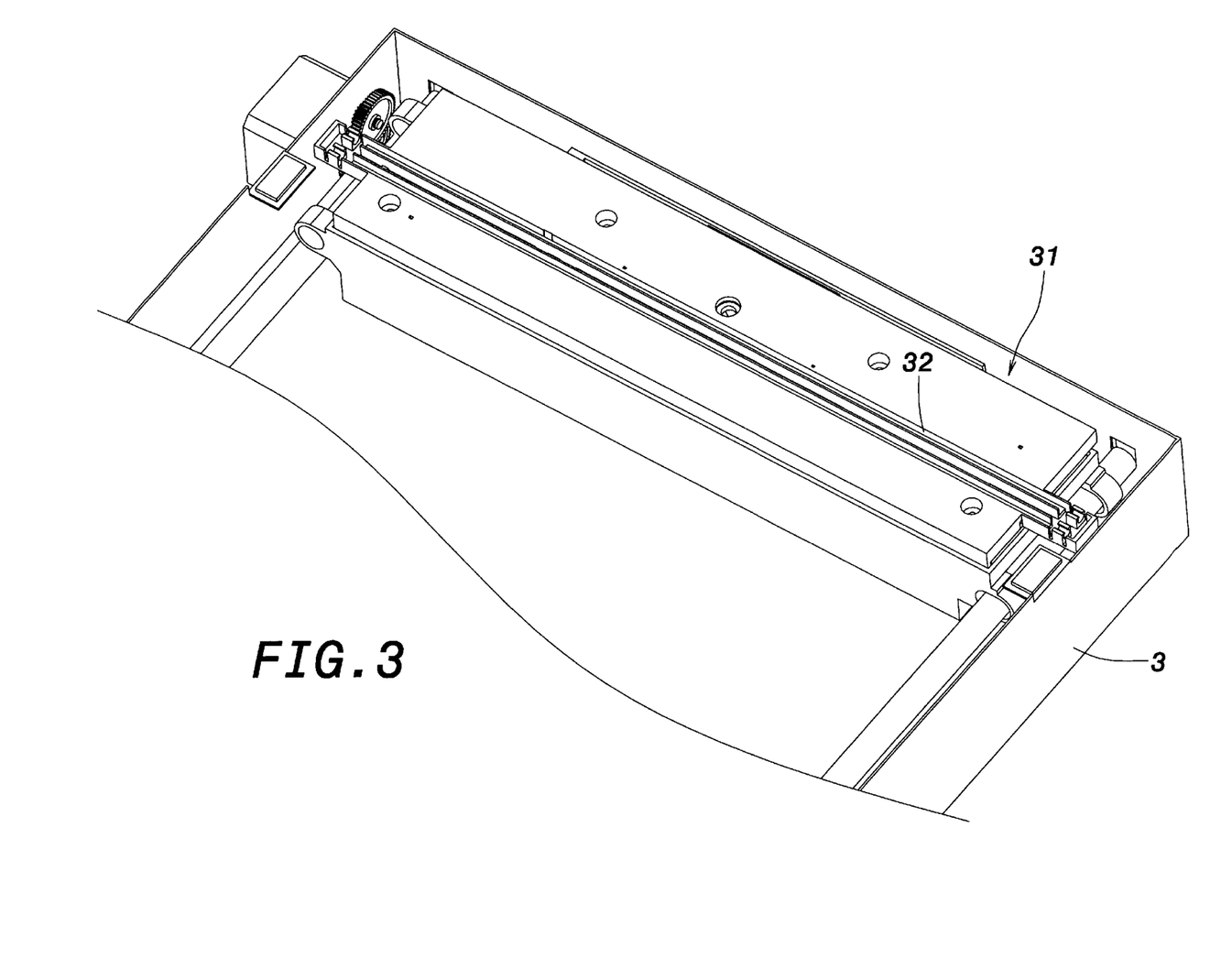
FIG. 3 is a perspective view of a scanner of the present invention, wherein a lamp tube is not placed yet.
Figure 5:
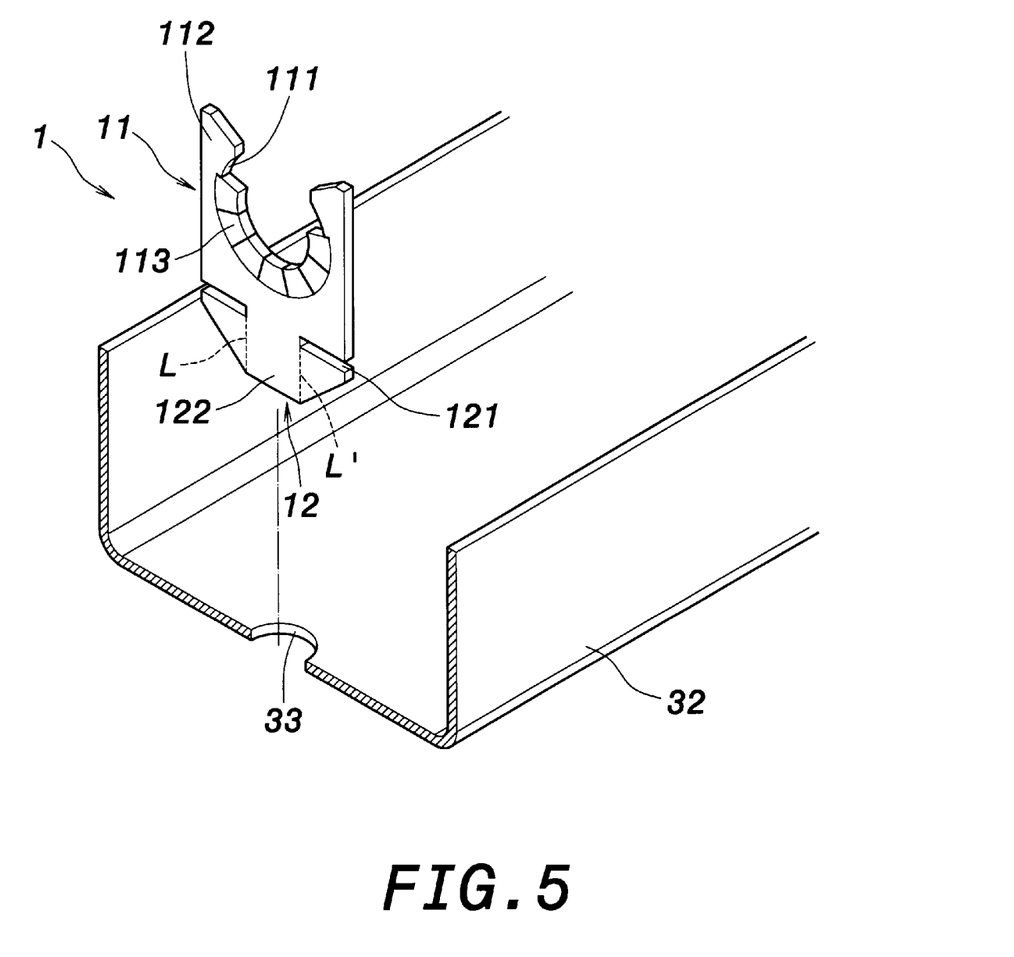
FIG. 5 shows a use state of the present invention before a support piece is placed on a rack.

The present invention relates to a lamp tube support structure, which mainly applies to an office business machine such as a scanner, a copier, or a multi-function platform (MFP) having copying, scanning, and printing functions. As shown in FIG. 3, the office business machine is exemplified with a scanner 3. The scanner 3 has a lamp seat 31. A U-shaped rack 32 for supporting a lamp tube 2 is disposed at the upper end of the lamp seat 31. A hole 33 is formed at the center of the rack 32, as shown in FIG. 5.

Figure 4:
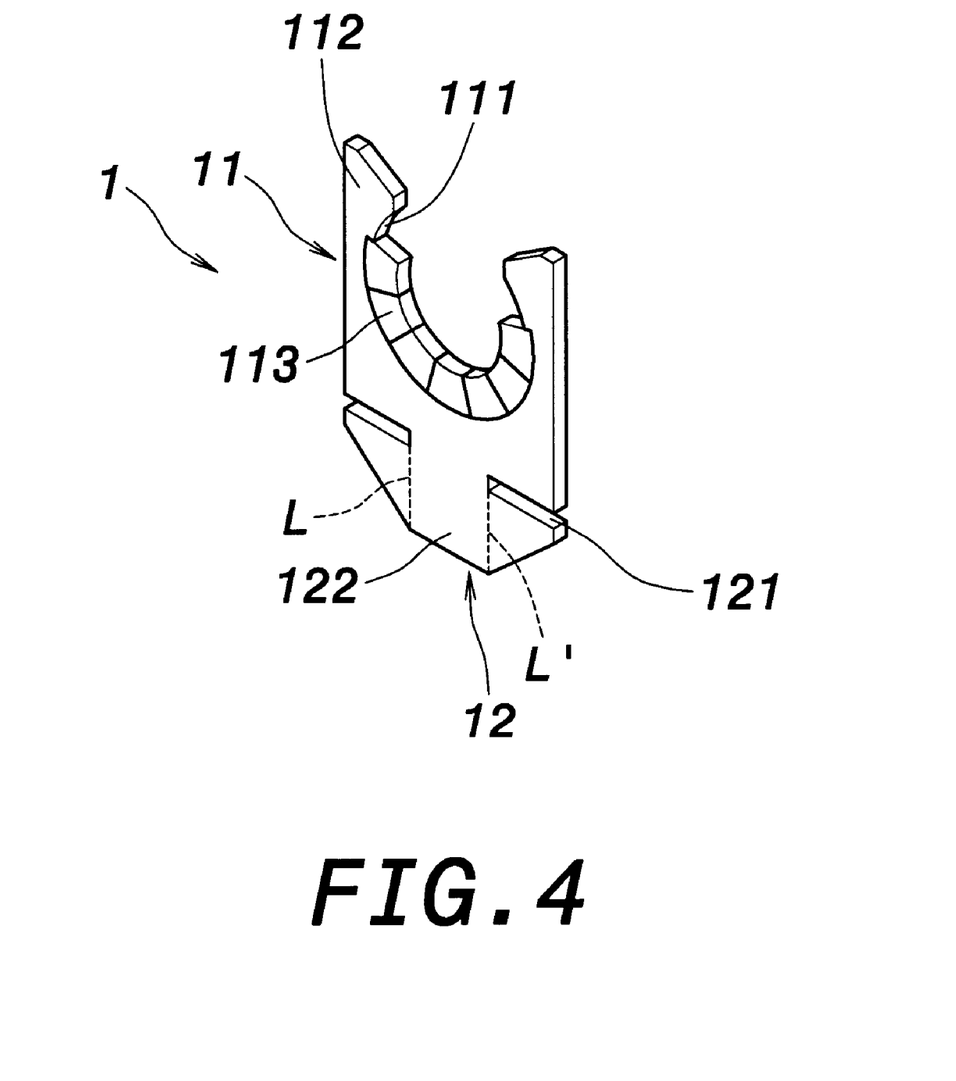
FIG. 4 is perspective view of a supporting piece of the present invention.

As shown in FIG. 4, the lamp tube support structure of the present invention is a support piece 1 for supporting and fixing the lamp tube 2. The support piece 1 can be a plastic or metallic sheet, and is formed by joining a first half 11 and a second half 12.

The first half 11 has a gap 111 larger than a semicircle. A clamping portion 112 is formed at two extension ends of the gap 111. The opening of the clamping portion 112 is designed to be smaller than the diameter of the lamp tube 2. A guard ear 113 is annularly disposed at most regions of the inner edge of the gap 111. The guard ear 113 is equal to or slightly larger;than the diameter of the lamp tube 2.

Grooves 121 are disposed at left and right ends of the second half 12. A wing portion 122 is formed below the grooves 12.

Figure 6:
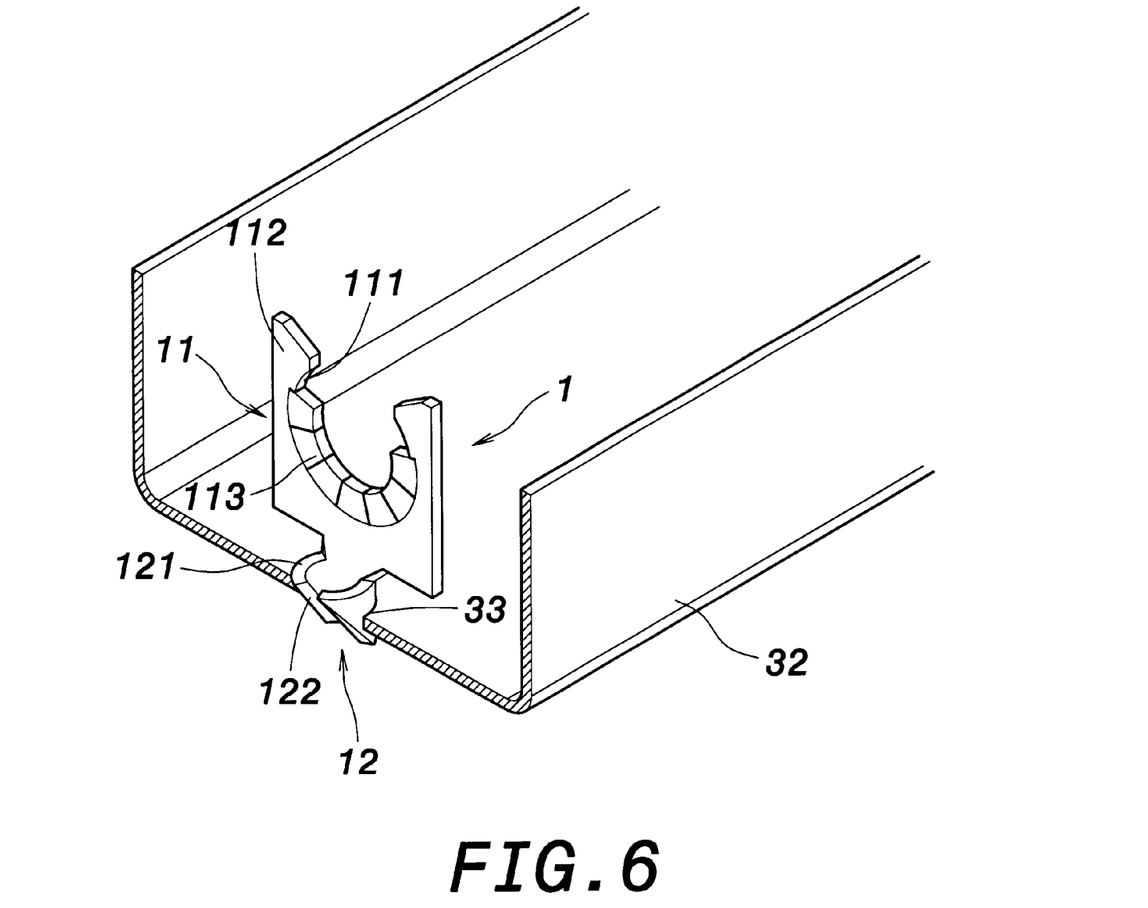
FIG. 6 shows a use state of the present invention after a support piece is placed on a rack.

As shown in FIGS. 5 and 6, after left and right sides of the wing portion 122 of the support piece 1 are bent inwards along dashed lines L and L', the wing portion 122 is jammed into the hole 33 of the rack 32. After the wing portion 122 completely passes through the hole, it can elastically spring back to let the support piece 1 be erectly fixedly on the rack 32.

Figure 7:
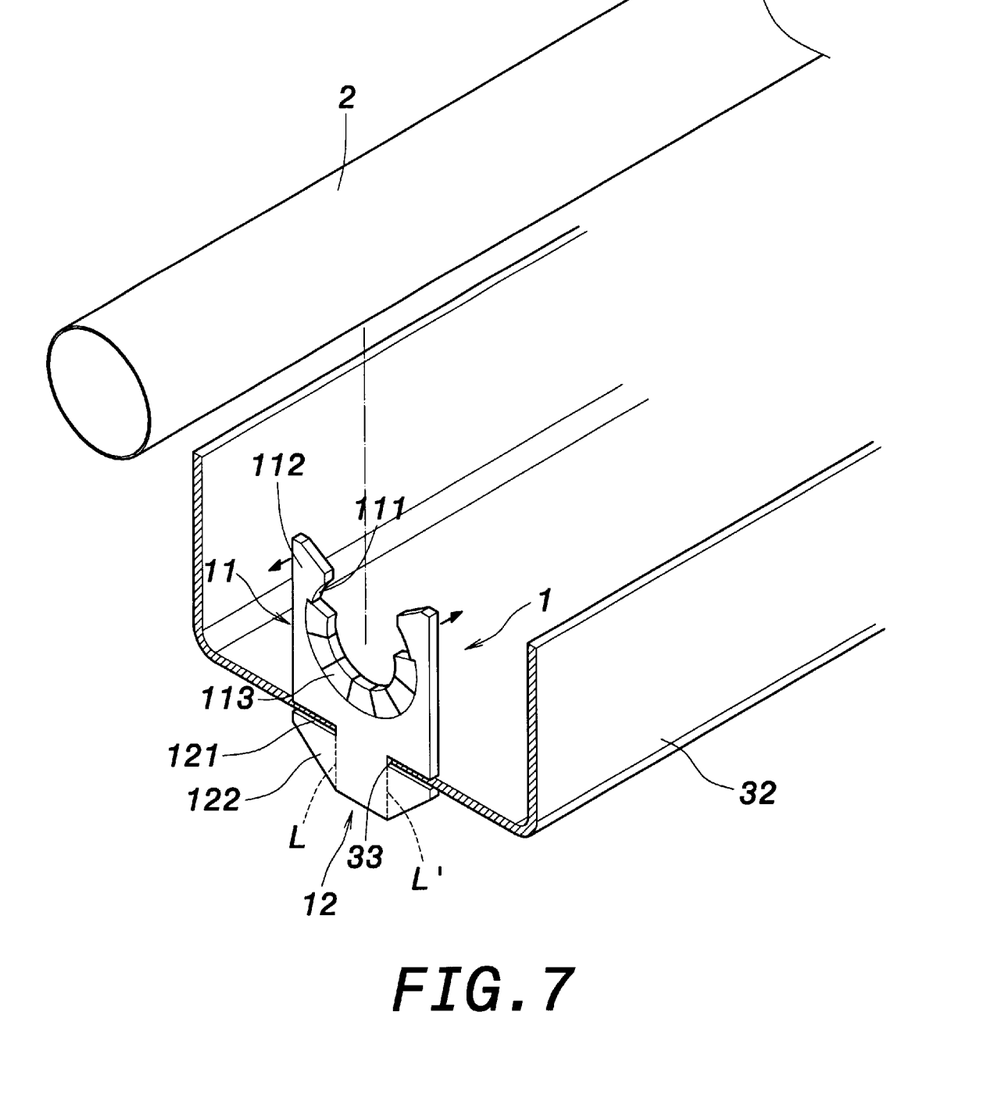
FIG. 7 shows a use state of the present invention before a lamp tube is placed on a support piece.
Figure 8:
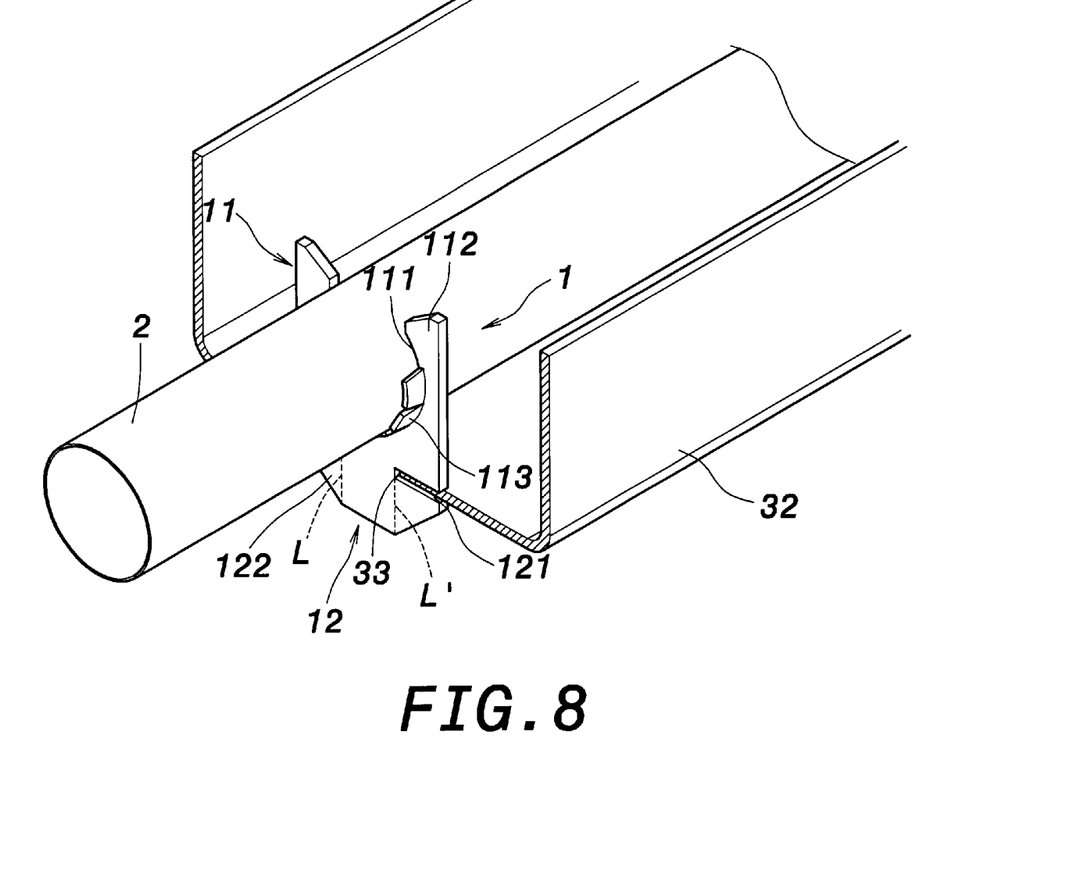
FIG. 8 shows a use state of the present invention after a lamp tube is placed on a support piece.
Figure 9:
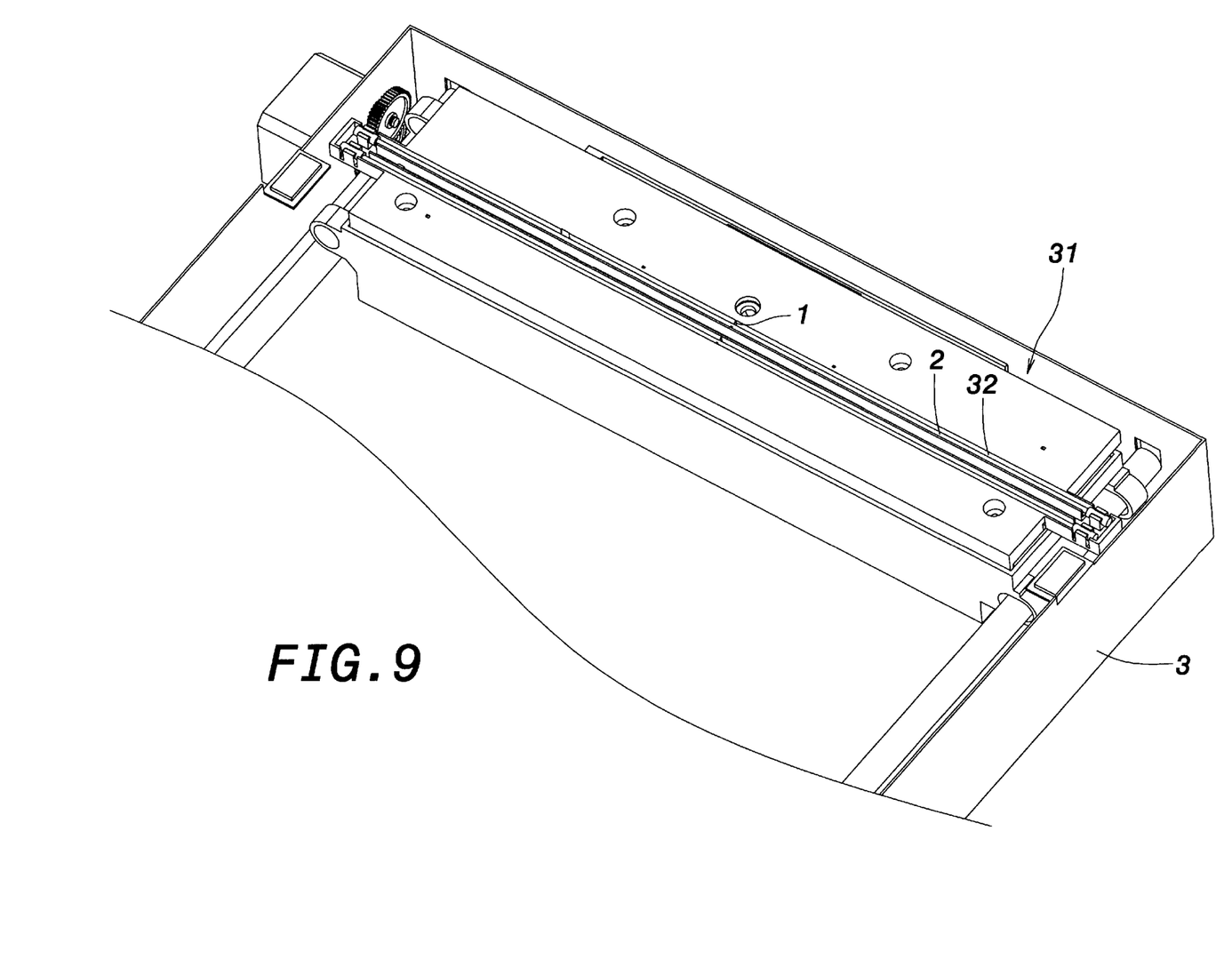
FIG. 9 is a perspective view of the present invention when a lamp tube has been placed in a scanner.
Figure 10:
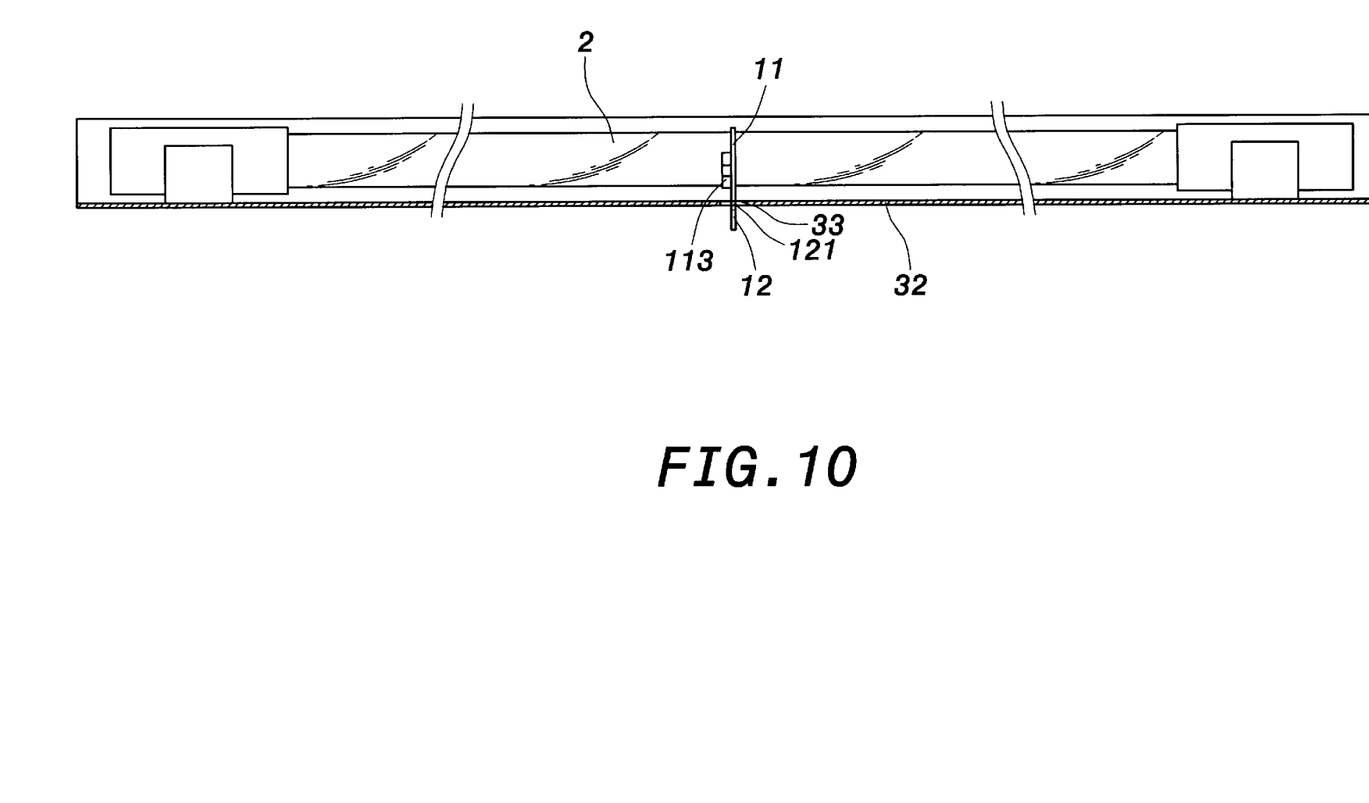
FIG. 10 is a cross-sectional view of the present invention when a lamp tube has been placed in a scanner.

As shown in FIGS. 7 and 8, when placing the lamp tube 2, the clamping portion 112 of the support piece 1 is deformed front and back so that the underpart of the lamp tube 2 can be slipped into the gap 111 of the support piece 1. The guard ear 113 will be pressed to bend sideward so that the lamp tube 2 can be fixed in the gap 111. Other part of the lamp tube 2 is placed on the rack 32. The lamp tube 2 can thus be fixed on the lamp seat 31, as shown in FIGS. 9 and 10.

Besides, because of the disposition of the guard ear 113, the shearing force between the lamp tube 2 and the support piece 1 during impact can be reduced. Because the opening of the clamping portion 112 is smaller than the diameter of the lamp tube 2, the lamp tube 2 can be further protected from impact from all directions.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A lamp tube support structure being mainly a support piece applying to an office business machine for supporting and fixing a lamp tube, said lamp tube support structure comprising:

a first half having a gap used for placing said lamp tube, a clamping portion being formed at two extension ends of said gap; and a second half with grooves disposed at left and right ends thereof, a wing portion being formed below said grooves, said wing portion being jammed into a hole of a rack for supporting said lamp tube so as to be erectly fixed on said rack after being bent.

2. The lamp tube support structure as claimed in claim 1, wherein said business machine is a scanner, a copier, or a multi-function platform.

3. The lamp tube support structure as claimed in claim 1, wherein said support piece is a plastic or metallic sheet.

4. The lamp tube support structure as claimed in claim 1, wherein a guard ear is annularly disposed at an inner edge of said gap.

5. The lamp tube support structure as claimed in claim 1, wherein an opening of said clamping portion is smaller than the diameter of said lamp tube.

* * * * *